Dec. 27, 1949     C. P. HEYART ET AL     2,492,933
ELECTRIC CONTROLLER

Filed March 14, 1949     2 Sheets-Sheet 1

*INVENTORS*
CHARLES P. HEYART
BY ELMER R. ROSS
ATTORNEYS

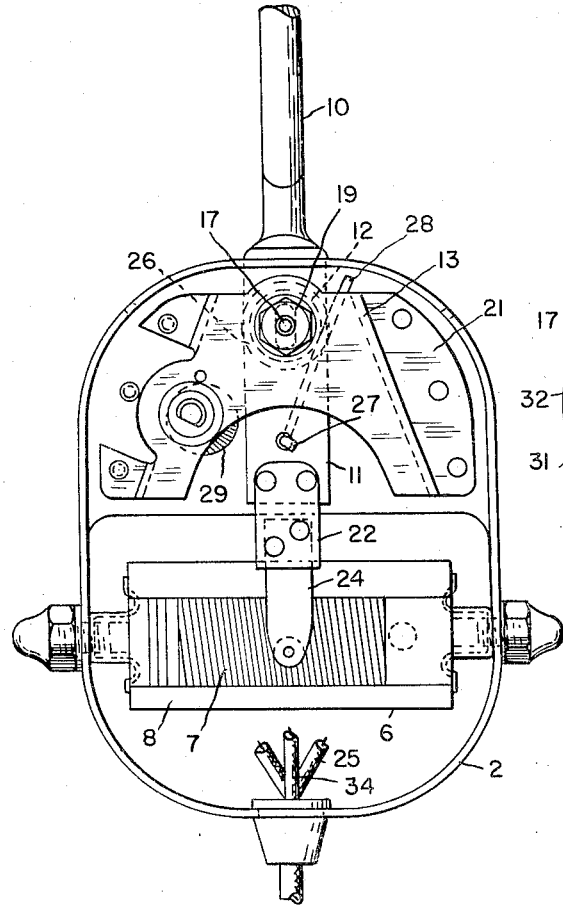
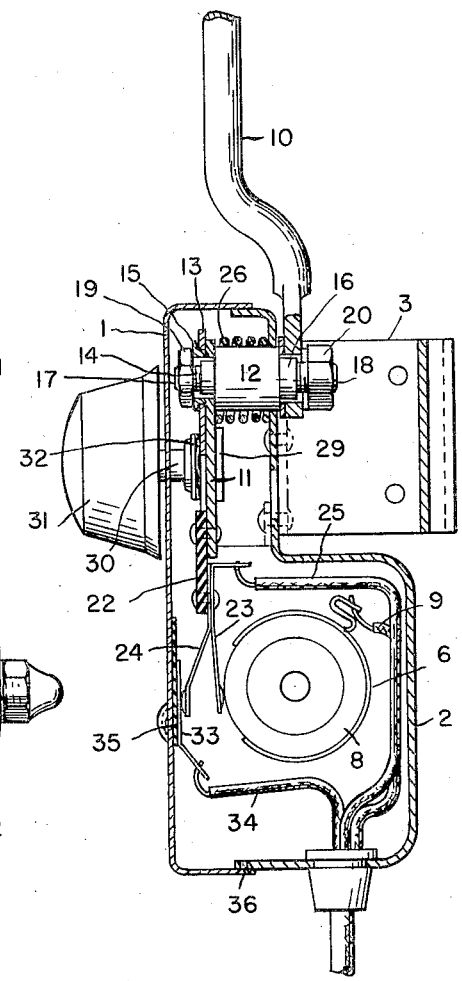
FIG.3.
FIG.4.

Patented Dec. 27, 1949

2,492,933

UNITED STATES PATENT OFFICE 2,492,933

ELECTRIC CONTROLLER

Charles P. Heyart, Lincoln Park, and Elmer R. Ross, Detroit, Mich., assignors to Kelsey-Hayes Wheel Company, Detroit, Mich., a corporation of Delaware Application March 14, 1949, Serial No. 81,300

4 Claims. (Cl. 201—48)

1

The invention relates to electric controllers and refers more particularly to controllers for electrically actuated brakes of vehicles.

The invention has for one of its objects to provide an improved controller for an electric brake of a vehicle having its parts so constructed that they may be economically manufactured and assembled in compact relation.

The invention has for another object the provision of an improved electric controller having a rotatably adjustable cam engageable with a pivotal lever to limit the swinging of the lever in a direction from the off position to the on position.

The invention has for another object to provide an improved controller for an electric brake of a vehicle which is provided with a stop light, the controller being provided with a brake control resistance winding, a stop light control contact plate, a pivotal lever and control contacts on the lever engageable with the resistance winding and contact plate.

With these and other objects in view the invention resides in the novel features of construction and combinations and arrangements of parts as more fully hereinafter set forth:

In the drawings:

Figure 3 is a front elevation thereof with the front housing section removed;

Figure 1:
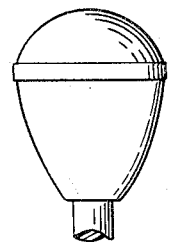
Figure 1 is a front elevation of an electric controller embodying the invention.
Figure 5:
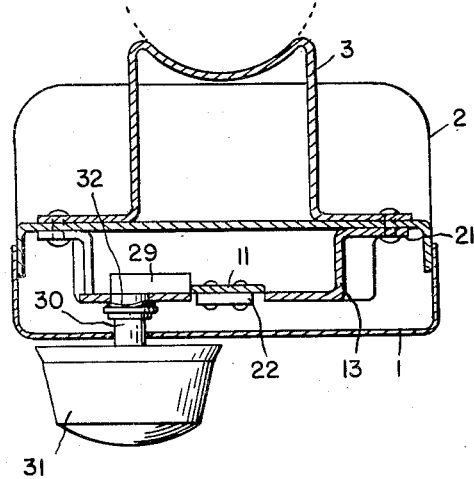
Figure 2:
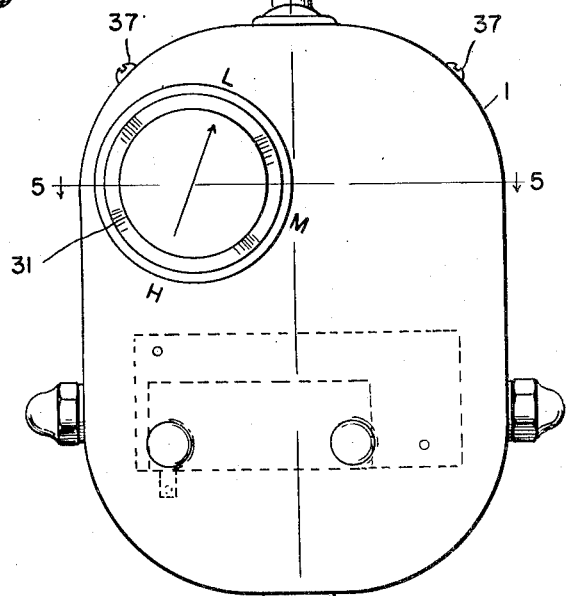
Figure 2 is a top plan view thereof.
Figure 2:
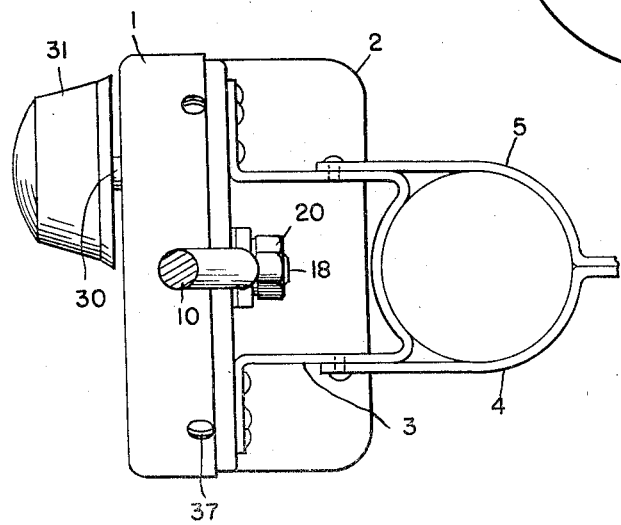

Figures 4 and 5 are cross sections on the lines 4—4 and 5—5 respectively of Figure 1.

The electric controller is designed for use with electrically actuated brakes of vehicles and more particularly trailers coupled to motor vehicles. As shown, the electric controller comprises the front and rear housing sections 1 and 2 respectively which form a housing for the control parts. The electric controller is adapted to be mounted on the steering column of the motor vehicle by means of the bracket 3 secured to the rear housing section and the clamping members 4 and 5 secured to the sides of the bracket, the bracket and clamping members being shaped to substantially conform to the steering column.

6 is the brake control resistance element mounted in the lower portion and extending transversely of the rear housing section and having the resistance winding 7 on the insulation spool 8 and exposed through a window of the insulation. One end of the resistance winding is connected to the wire 9 leading to the actuators of the electric brakes of the trailer. 10 is a manually operable lever pivotally mounted on the rear housing section 2 and 11 is an arm within the housing swingable in unison with the lever. 12 is a shouldered pivot pin journaled in the rear housing section 2 and the channel shaped bracket 13, the central portion of the pivot pin being of greatest diameter and journaled in the rear housing section and the reduced front end portion 14 of the pivot pin being journalled in the front wall of the bracket through the bushing 15. The lever 10 is non-rotatably secured to the reduced rear end portion 16 of the pivot pin at the rear side of the rear housing section 2 and the arm 11 is non-rotatably secured to the reduced front end portion 14 of the pivot pin between the central portion of the pivot pin and the front wall of the bracket 13. In the present instance, the reduced end portions of the pivot pin to which the lever and arm are secured are formed with diametrically opposite flat sides and the openings in the lever and arm are correspondingly shaped. The pivot pin has beyond its reduced end portions 14 and 16 the further reduced threaded end portions 17 and 18 which are engaged by the nuts 19 and 20 respectively for securing the parts in place. The bracket 13 has at its sides the foot flanges 21 which are secured to the rear housing section 2.

The arm 11 has secured to its lower end the insulation block 22 to which the resilient contacts 23 and 24 are secured. These contacts are connected to the wire 25 leading to the source of electric energy such as the electric battery of the motor vehicle. The manually operable lever 10 and arm 11 are normally retained in off or inoperative position with the contact 23 out of engagement with the resistance winding 7 by means of the coil spring 26 which encircles the central portion of the pivot pin 12 and has one end 27 extending through a hole in the arm and the other end 28 abutting an edge of the bracket 13.

For limiting the swinging of the lever 10 and arm 11 in a direction from the off position to the on position in which the contact 23 engages the resistance winding 7, there is the cam 29 within the housing and engageable with the arm. This cam is an eccentric mounted on the shaft 30 which is journalled in the front wall of the bracket and the front housing section 1. 31 is a knob secured to the front end of the shaft and located externally of the housing to provide for readily rotatably adjusting the eccentric to a position substantially in accord with the load being carried by the trailer whereby the electric controller controls the operation of the electric brakes substantially in accordance with this load.

To hold the eccentric in adjusted position, its front face and the rear face of the front wall of the bracket 13 are radially serrated and these faces are resiliently held in contact by the spring washer 32 located between the front wall of the bracket and a collar on the shaft 30.

33 is a contact plate formed of electric conducing material within the housing and spaced from the resistance winding 7 and connected to the wire 34 leading to the stop light of the trailer. This contact plate is mounted on the rear side of the front housing section 1 and insulated from this housing section by means of the insulation sheet 35. The contact plate is positioned with respect to the resistance winding so that upon swinging of the lever 10 and the arm 11 from the off position and engagement of the contact 23 with the resistance winding the contact 24 engages the contact plate 33 and completes the electric circuit to the stop light.

As shown the front housing section 1 is secured to the rear housing section 2 by the pin 36 at the lower end of the front housing section engaging an opening at the lower end of the rear housing section and the screws 37 extending through the uper end portion of the front housing section and threaded into the upper end portion of the rear housing.

What we claim as our invention is:

1. A controller for an electric brake of a vehicle provided with a stop light comprising a housing, a brake control resistance winding within said housing, a stop light control electrical conducting plate within said housing and spaced from said resistance winding, a lever pivoted on said housing, an arm within said housing movable with said lever, resilient control contacts on said arm engageable with said resistance winding and plate and an adjustable cam within said housing engageable with said arm to limit the swinging thereof in one direction.

2. A controller for an electric brake of a vehicle provided with a stop light comprising a pair of cooperating sections forming a housing, a brake control resistance winding mounted on one of said housing sections and located within the housing, a stop light control contact plate mounted on the other of said housing sections and located within the housing and spaced from said resistance winding, a manually operable lever pivoted on one of said housing sections, an arm within the housing movable with said lever, resilient control contacts on said arm engageable with said resistance winding and contact plate and an adjustable cam mounted on one of said housing sections and located within the housing and engageable with said arm to limit the swinging thereof in the direction from the off position to the on position.

3. A controller for an electric brake of a vehicle provided with a stop light comprising a housing formed of front and rear housing sections, a brake control resistance winding within said housing and mounted on one of said sections, a stop light control contact plate within said housing and mounted on the other of said sections, a manually operable arm within said housing and pivotally mounted on one of said sections and resilient control contacts on said arm movable upon swinging of said arm from the off position to the on position into engagement with said resistance winding and contact plate.

4. A controller for an electric brake of a vehicle comprising a housing, a brake control resistance winding within said housing, a manually operable angularly movable arm within said housing, a resilient control contact on said arm engageable with said resistance winding and a rotatably adjustable eccentric within said housing forming a cam engageable with said arm to limit the swinging thereof in a direction from the off position to the on position.

CHARLES P. HEYART.
ELMER R. ROSS.

No references cited.